United States Patent
Hull

[19]

[11] Patent Number: 6,097,118
[45] Date of Patent: Aug. 1, 2000

[54] RELUCTANCE APPARATUS FOR FLYWHEEL ENERGY STORAGE

[75] Inventor: John R. Hull, Downers Grove, Ill.

[73] Assignee: University of Chicago, Chicago, Ill.

[21] Appl. No.: 09/183,141

[22] Filed: Oct. 30, 1998

[51] Int. Cl.[7] .................................................. H02K 7/02
[52] U.S. Cl. ........................... 310/74; 310/90.5; 310/90; 310/156; 310/268; 310/261
[58] Field of Search .......................... 310/74, 90.5, 191, 310/156, 268, 261, 90

[56] References Cited

U.S. PATENT DOCUMENTS

| | | | |
|---|---|---|---|
| 3,700,943 | 10/1972 | Heintz et al. | 310/168 |
| 3,700,944 | 10/1972 | Heintz | 310/168 |
| 4,920,291 | 4/1990 | McSparran | 310/90.5 |
| 5,179,307 | 1/1993 | Porter | 310/68 B |
| 5,191,256 | 3/1993 | Reiter, Jr. et al. | 310/156 |
| 5,227,702 | 7/1993 | Nahirney | 318/138 |
| 5,396,140 | 3/1995 | Goldie et al. | 310/268 |
| 5,406,157 | 4/1995 | New | 310/90.5 |
| 5,532,532 | 7/1996 | DeVault et al. | 310/52 |
| 5,625,241 | 4/1997 | Ewing et al. | 310/156 |
| 5,625,276 | 4/1997 | Scott et al. | 322/24 |
| 5,696,419 | 12/1997 | Rakestraw et al. | 310/268 |
| 5,703,423 | 12/1997 | Fukao et al. | 310/90.5 |
| 5,705,902 | 1/1998 | Merritt et al. | 318/254 |
| 5,717,316 | 2/1998 | Kawai | 322/46 |
| 5,719,456 | 2/1998 | Kolomeitsev | 310/112 |
| 5,742,139 | 4/1998 | Kolomeitsev | 318/254 |
| 5,844,344 | 12/1998 | Uetake et al. | 310/156 |
| 5,861,695 | 1/1999 | Brassard | 310/154 |

OTHER PUBLICATIONS

Paul Longwell et al., "Flywheel Power," (May 20, 1998) http://ps.phys.psu.ed. . . flywheel/flywheel12.htm.
"The Just–in–Time Revolution in Power Control," (May 20, 1998) http;//www.trinityflywheel.com/flytech.htm.
G. Paula, "The Rise of VSR Motors," Mechanical Engineering, pp. 86–87 (Feb. 1998).
V.S. Ramsden et al., "Design of an In–Wheel Motor for a Solar–Powered Electric Vehicle," (1997) http://www.tip.c-siro.a. . . /#3.
John R. Hull, "Magnetic Levitation," IEEE Encyclopedia, Oct. 1, 1997.
John R. Hull, "Superconducting Levitation," IEEE Encyclopedia, Aug. 5, 1997.
John R. Hull, "Flywheels on a Roll," IEEE Spectrum, pp. 20–25 (Jul. 1997).
Thomas M. Mulcahy et al., "A Permanent–Magnet Rotor for a High–Temperature Superconducting Bearing," IEEE Transactions on Magnetics, vol. 32, No. 4, pp. 2609–2612 (Jul 1996).
J.R. Hull et al., "Low Rotational Drag in High–Temperature Superconducting Bearings," IEEE Transactions on Applied Superconductivity, vol. 5, No. 2, pp. 626–629 (Jun. 1995).
R.H. Engelmann et al., Handbook of Electric Motors, Marcel Dekker, Inc., pp. 120–136 (1995).
Robert G. Abboud et al., "Flywheel Energy Storage Using Superconducting Magnetic Bearings," 56th Annual American Power Conference, Chicago, IL, Apr. 27, 1994.
John R. Hull et al. "Flywheel Energy Storage Using Superconducting Magnetic Bearings," Applied Superconductivity, vol. 2, No. 7/8, pp. 449–455 (1994).
Thomas D. Rossing et al., "Magnetic Levitation," The Physics Teacher, pp. 552–562 (Dec. 1991).

(List continued on next page.)

*Primary Examiner*—Nestor Ramirez
*Assistant Examiner*—Thanh Lam
*Attorney, Agent, or Firm*—Foley & Lardner

[57] ABSTRACT

A motor generator for providing high efficiency, controlled voltage output or storage of energy in a flywheel system. A motor generator includes a stator of a soft ferromagnetic material, a motor coil and a generator coil, and a rotor has at least one embedded soft ferromagnetic piece. Control of voltage output is achieved by use of multiple stator pieces and multiple rotors with controllable gaps between the stator pieces and the soft ferromagnetic piece.

3 Claims, 6 Drawing Sheets

OTHER PUBLICATIONS

Timothy J.E. Miller, "Converter Volt–Ampere Requirements of the Switched Reluctance Motor Drive," IEEE Transactions on Industry Applications, vol. IA–21, No. 5, pp. 1136–1144 (Sep./Oct. 1985).

P.J. Lawrenson et al., Variable–Speed Switched Reluctance Motors, Proc. IEEE, vol. 127, pt. B, No. 4, pp. 253–265 (Jul. 1980).

L.E. Unnewehr et al., "An Axial Air–Gap Reluctance Motor for Variable Speed Applications," IEEE Trans. Power Apparatus and Systems, vol. PAS–93, pp. 367–376 (Jan. 1974).

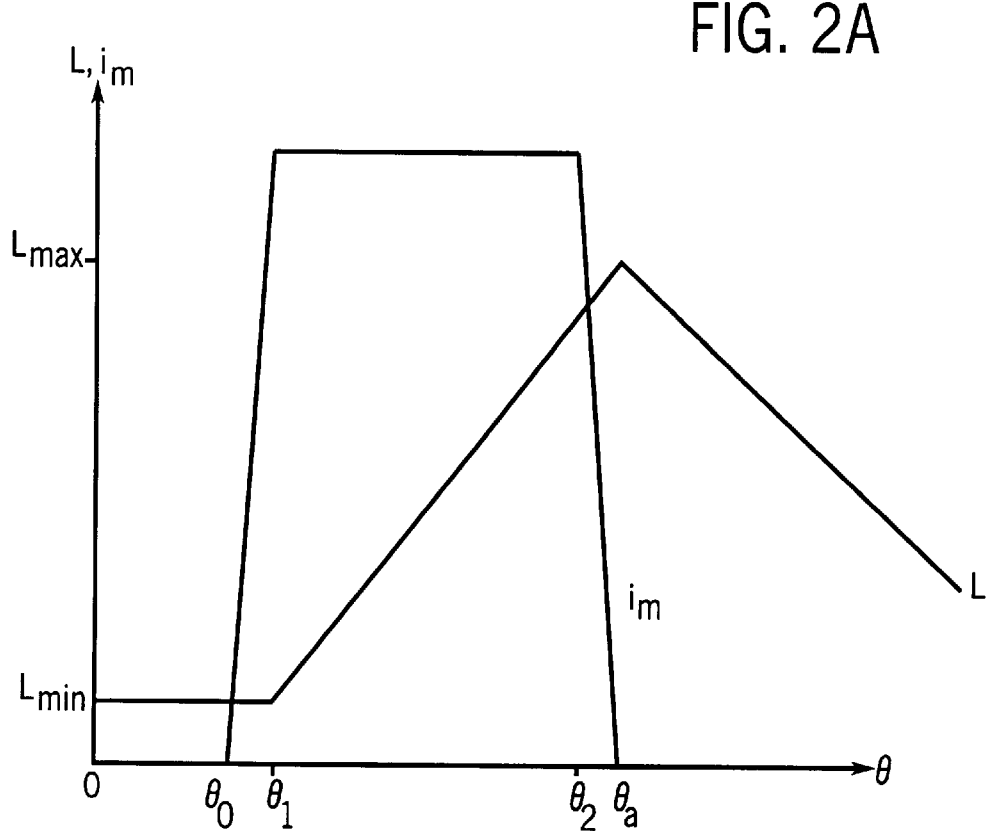
FIG. 2A
UNALIGNED
FIG. 2B
ALIGNED
FIG. 2C

RELUCTANCE APPARATUS FOR FLYWHEEL ENERGY STORAGE

This invention was made with Government support under Contract No. W31-109-ENG-38 awarded by the Department of Energy. The Government has certain rights in this invention.

BACKGROUND OF THE INVENTION

This invention is directed to a method and apparatus for storing energy in a flywheel system. More particularly, the invention is directed to a flywheel system having high-temperature superconducting bearings and a hubless reluctance motor-generator comprising at least one axial gap.

An essential component of most flywheel systems is a motor-generator. The motor-generators are typically used in applications where electrical energy is converted to rotational kinetic energy and vice versa. An important feature of a flywheel system is high velocity of rotation of the flywheel itself. Unfortunately, a high velocity of rotation invariably results in large centripetal forces which can stress the many components of a flywheel system, including both the flywheel and the motor-generator.

Efforts have been made to develop flywheel systems using high temperature superconducting bearings and motor-generators. For example, flywheel systems which utilize a Halbach internal-dipole concept have been made. Such flywheel systems have motor-generators with permanent magnets that rotate around a central stator coil (e.g., "hub"). The flywheel systems which utilize the Halbach internal-dipole concept are often desirable because their internal dipole field generally produces pure torque. Unfortunately, however, such systems possess characteristics that are not very favorable. For instance, flywheel systems utilizing a Halbach internal-dipole concept have brittle permanent magnets which can fracture upon being subjected to high stresses at large rotational speeds. They also tend to have dipole fields which leak out of the cylindrical region of the permanent magnet array which can result in undesirable eddy currents, hysteresis loss in magnetic materials or both. Further, like all systems with brushless permanent magnets, the flywheel systems with the Halbach internal-dipole concept suffer from idling losses in their stator coils. These characteristics prevent efficient operation in compact flywheel system designs.

It is of increasing interest to develop a method and apparatus for storing energy in a flywheel system that does not display the above-described deficiencies. This invention, therefore, is directed to a superior flywheel system that unexpectedly stores energy substantially free of, for example, eddy currents, hysteresis and idling losses.

SUMMARY OF THE INVENTION

It is therefore an object of the invention to provide an improved motor generator and flywheel system with a hubless motor-generator.

It is another object of the invention to provide a novel system capable of producing a constant output voltage.

It is a further object of the invention to provide an improved motor generator and flywheel system that is substantially free of eddy currents, hysteresis loss in magnetic materials and idling losses.

It is also an object of the invention to provide a novel motor generator apparatus and method of producing a constant output voltage.

It is an additional object of the invention to provide an improved apparatus and method in a flywheel system having an inverter which receives a constant voltage.

It is yet a further object of the invention to provide a novel motor generator with controllable stator/rotor gap for providing controlled output voltages in accordance with a user demand.

These and other objects, advantages and features of the invention, together with the organization and manner of operation thereof, will become apparent from the following detailed description when taken in conjunction with the accompanying drawings, wherein like elements have like numerals throughout the drawings described below.

BRIEF DESCRIPTION OF THE DRAWINGS

FIG. 2A illustrates one idealized timing diagram for the current in a motor coil superimposed on inductance of a motor generator apparatus; FIG. 2B shows an unaligned position for the stator and rotor ferromagnetic piece and FIG. 2C shows an aligned position for the stator and the rotor ferromagnetic piece;

DETAILED DESCRIPTION OF THE PREFERRED EMBODIMENTS

Figure 1:
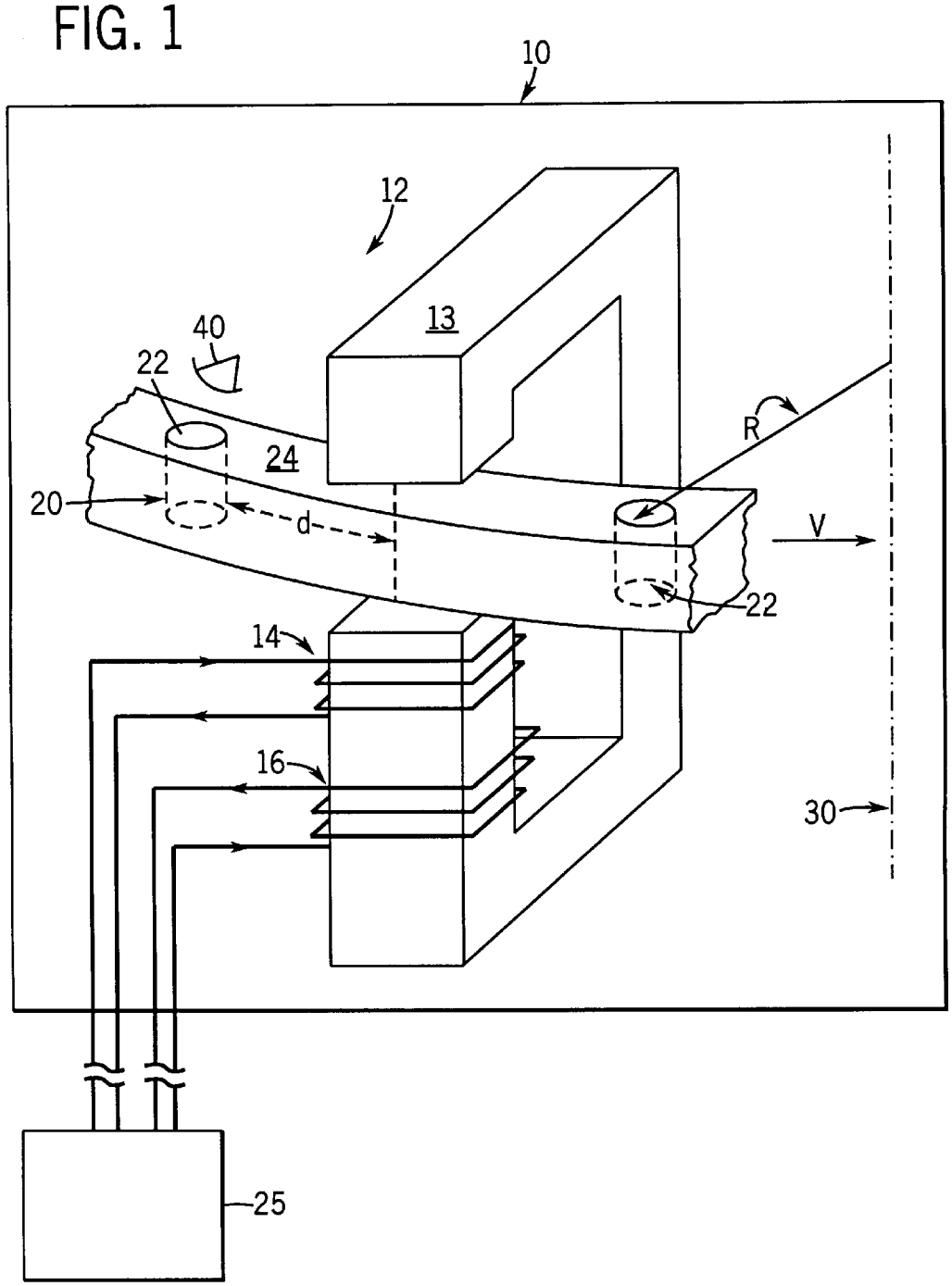
FIG. 1 illustrates a single pole of the motor-generator used in the flywheel system of this invention.

Referring to the figures, and more particularly to FIG. 1, a single pole of a motor-generator 10 is generally shown. The motor generator 10 comprises a stator 12 and a rotor 20. The stator 12 includes a soft ferromagnet 13, a motor coil 14 and a generator coil 16. The rotor 20 has a stiff mechanical ring 24 in which are embedded soft ferromagnetic pieces 22. The high permeability ferromagnetic pieces 22 are located at radius R from centerline 30 and travel with circumferential velocity v. The rotor 20 rotates at angular velocity ω=v/R. There is one or more of sensors 40 that detects the position of the ferromagnetic piece 22 and provides information to a power supply/control system 25 that switches the current to the motor coil 14. The system 25 can be conventional power supply and a coupled computer/computer control device. The sensor 40 can be an optical sensor, an eddy current sensor, and other such conventional sensors. This type of motor generator 10 can find utilization in a number of systems, including flywheel energy storage systems such as the ones disclosed in U.S. Pat. No. 5,214,981, which is incorporated by reference herein.

FIG. 2A shows one form of idealized timing for the current $i_m$ in the motor coil 14, superimposed on the inductance L of the motor generator 10. The horizontal axis shows the rotation angle θ, but could also be represented by time since θ=ω t. The actual shapes of the inductance and current would be smoother than the idealized curves shown. At θ=0, the ferromagnetic piece 22 on the rotor 20 is far from the stator poles of the soft ferromagnet 13, and the inductance is at a minimum in this unaligned position (see FIG. 2B). By the time the rotor 20 moves to $\theta_1$, the soft ferromagnet 13 is close enough to the poles that the inductance begins to rise. When the rotor 20 reaches $\theta_a$, an aligned position (see FIG. 2C), the ferromagnetic piece 22 of the rotor 20 is directly in line with the stator poles of the stator 12 and the inductance is at a maximum. The general idea for current timing is that the voltage to the generator coil 16 is switched on at $\theta_0$, so that by the time the inductance starts to rise at $\theta_1$ the current has reached its maximum value. This then provides an attractive force between the stator 12 and the ferromagnetic piece 22 of the rotor 20. At time $\theta_2$ the voltage is switched off, so that the current has decayed to zero by the time the ferromagnetic pieces 22 are aligned with the stator poles of the stator 12. If the current is on during the part of the rotation when the inductance is decreasing, then there is a decelerating force on the rotor 20, and it is desirable to avoid this. The desired timing signals can be generated in a conventional manner from the power supply/control system 25 shown in FIG. 1.

To act as a generator, the voltage to the motor winding 14 is left on continuously. As the ferromagnetic pieces 22 of the rotor 20 pass through the stator 12, the inductance changes; and the flux passing through the generator coil 16 changes in an alternating fashion, so that an alternating voltage is produced at the output of the motor coil 14.

In a motor mode of operation the generator coil 16 is left open circuited. In an idling mode, both the motor coil 14 and generator coil 16 are left open circuited. It should be clear that if there is no current in the motor coil 14, then there is no flux in the circuit; and the rotor 20 will experience no force when the motor coil 14 is deenergized. Thus, there should be no idling losses.

Figure 3:
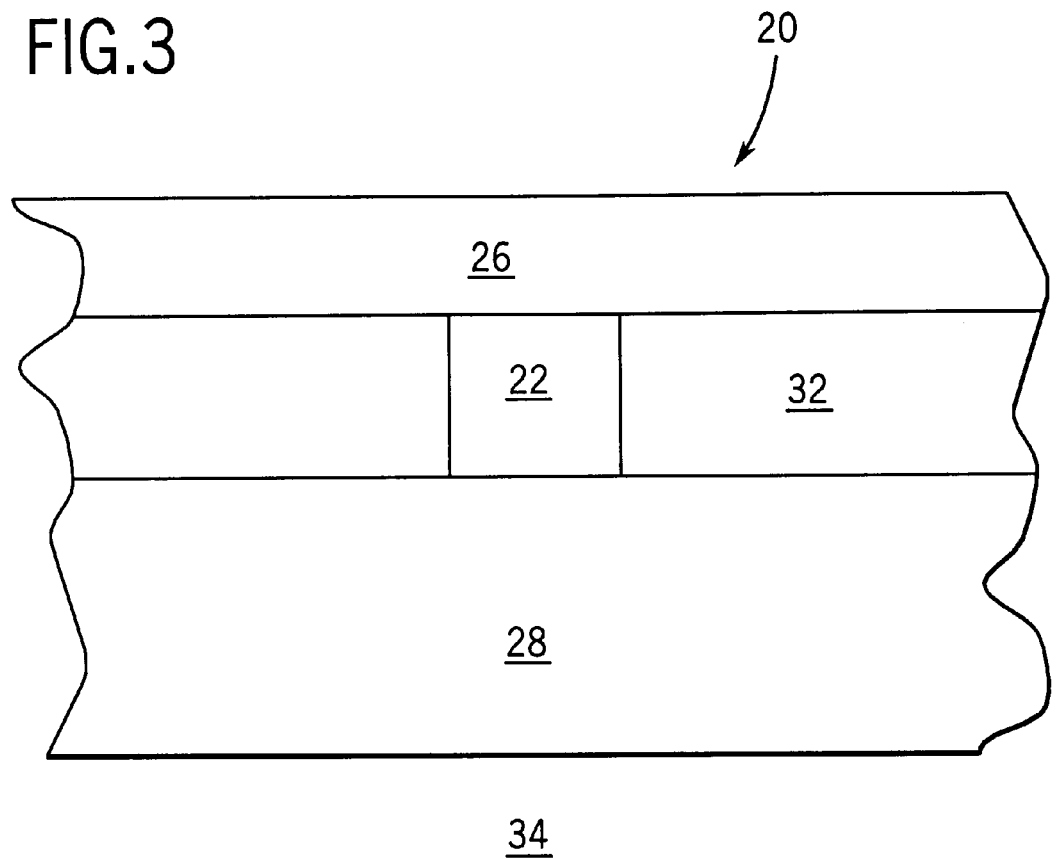
FIG. 3 illustrates one form of a rotor component of a motor generator apparatus.

FIG. 3 shows a possible embodiment of the rotor 20 of the motor generator 10. The rotor 20 has the ferromagnetic piece 22, a nonferromagnetic piece 32 on either side of the ferromagnetic piece 22 at the same radius, an inner mechanical band 26, an outer mechanical band 28, and an optional connection to flywheel inertial section 34. To reduce losses, all of the pieces should be electrically nonconducting, although it can be desirable in some modes of operation to make the ferromagnetic piece 22 somewhat conducting. For example, the ferromagnetic piece 22 can be composed of steel laminations. Alternatively, the ferromagnetic piece 22 can be composed of nonconducting ferrite. The bands 26, 28 and 32 can be of fiber composites, e.g., carbon fiber in an epoxy matrix. Other fibers such as E-glass, S-glass and Kevlar are also quite acceptable. The band 26 is optional, but if present, it should be as thin as possible to serve mainly as a retaining ring. The band 28 carries all of the centrifugal load and the band 32 serves mainly as a circumferential spacer. The torque can be further increased in the motor mode of operation by operating the generator coil 16 with the same timing and polarity as the motor coil 14.

One aspect of the invention is to supply a constant output voltage in the generate mode of the motor generator 10. One way to achieve this is to increase the current to the motor coil 14 as the flywheel slows down. This requires a variable voltage dc bus for the input to the motor coil 14. This can, for example, be done with a voltage drop in the power electronics, which results in inefficiency. This can be accomplished by allowing the voltage to vary at the output of the generator coil 16. This can also be done more preferably by placing a variable transformer (not shown) between the power source and the input to the dc bus that powers the motor coil 14. The use of the transformer is more efficient than taking the loss in the power electronics but not as efficient as the embodiments described below.

Figure 4:
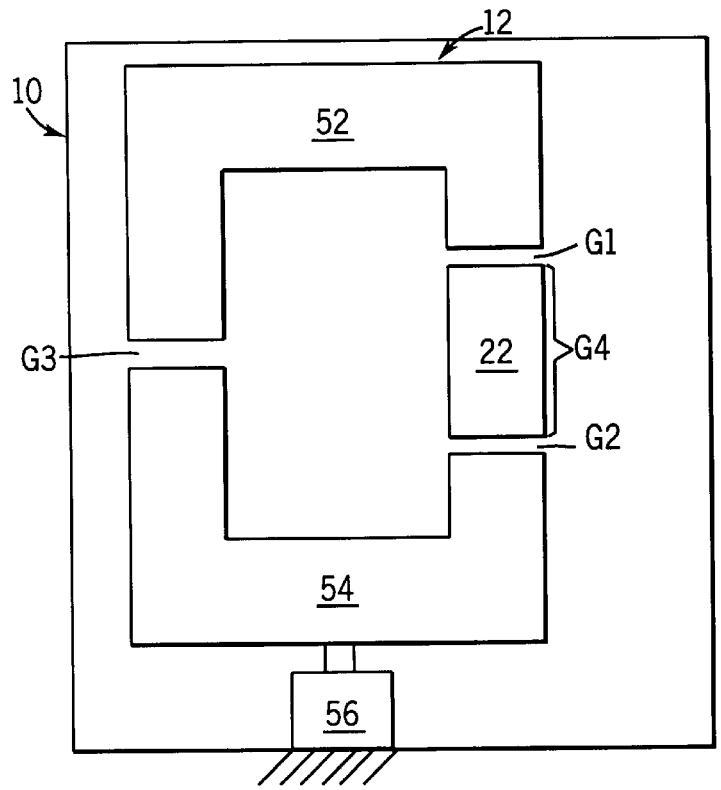
FIG. 4 illustrates another motor generator embodiment of the invention.

Another embodiment of the invention is shown in FIG. 4. In this embodiment the stator 12, shown without coils, includes an upper stator piece 52 and a lower stator piece 54. The upper stator piece 52 is stationary, while the lower stator piece 54 is connected to an actuator 56 that is capable of motion in the vertical direction. The actuator 56 can, for example, be operated as a piezoelectric, hydraulic or electromagnetic component. The air gaps in the magnetic system can be characterized by the following enumerated gaps: G1 between the upper stator piece 52 and the top of the ferromagnetic piece 22 in the rotor 20, G2 between the lower stator piece 54 and the bottom of the ferromagnetic piece 22, G3 between the return yoke part of stator pieces 52 and 54, and G4, the gap produced when the ferromagnetic piece 22 is in the unaligned position.

When the rotor 20 is in the unaligned position, the total gap consists of G1+G2+G3+G4. When the rotor 20 is in the aligned position, the gap consists of G1+G2+G3. In the motor mode of operation, the motor generator 10 can be operated so that G3=0 for maximum torque, but it could be operated at any convenient setting. In the generate mode of operation, at the minimum operating speed, the motor generator 10 is operated so that G3=0. Then the maximum inductance is determined by $G1o+G2o$; and the minimum is determined by $G1o+G2o+G4$. At maximum operating speed, G3 is increased to maintain a constant voltage. For example, if the ratio of maximum to minimum speed is 2/1, then G3 is set so that $G1+G2+G3=2(G1o+G2o)$. Since G1+G2 will increase by G3, we find that $G3=(G1o+G2o)/2$. In practice this is likely to be a gap of the order of a millimeter. In this example, we have assumed that G4 is large so that the minimum inductance is relatively insensitive to G3. In most practical applications, one will likely need to account for this small difference.

Figure 5:
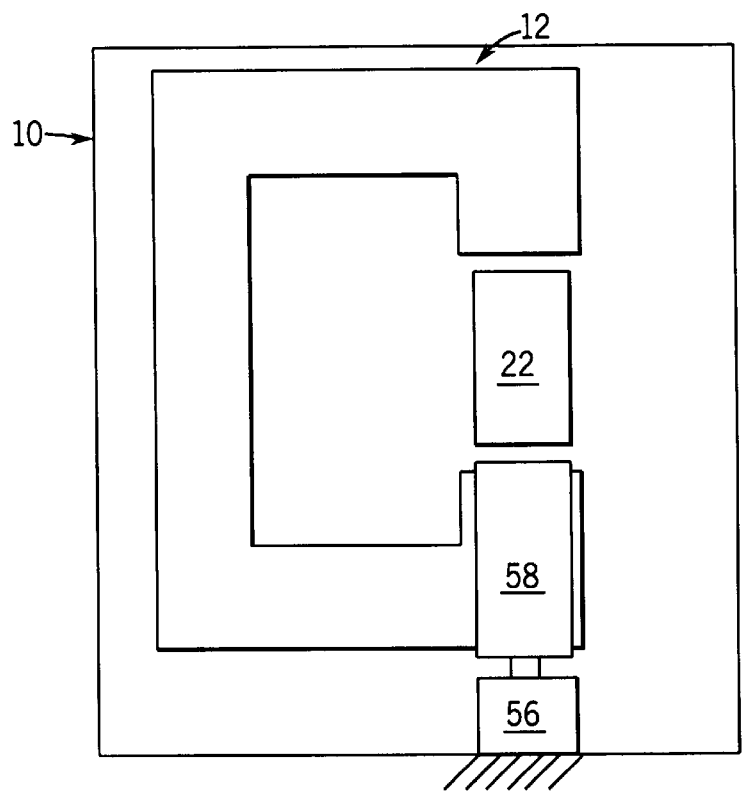
FIG. 5 illustrates a further motor generator embodiment without a split back yoke.

In FIG. 5 is shown another embodiment to produce constant voltage and does not involve splitting the back yoke. In this arrangement there is a movable pole piece 58 embedded in the motor generator 10 and connected to the actuator 56. Other variations of this concept to change the inductance in a similar manner should be apparent to those of skill in the art.

A typical form of the motor generator 10 is likely to have the pieces of the stator 12 distributed circumferentially around the motor generator 10. A number of the ferromagnetic pieces 22 on the rotor 20 will be similarly distributed, although the number of the ferromagnetic pieces 22 need not equal the number of stator pieces. The stator 14 can operate from a single phase, or there can be several phases. If there are two or more phases, the motor generator 10 will be self starting.

Figure 6:
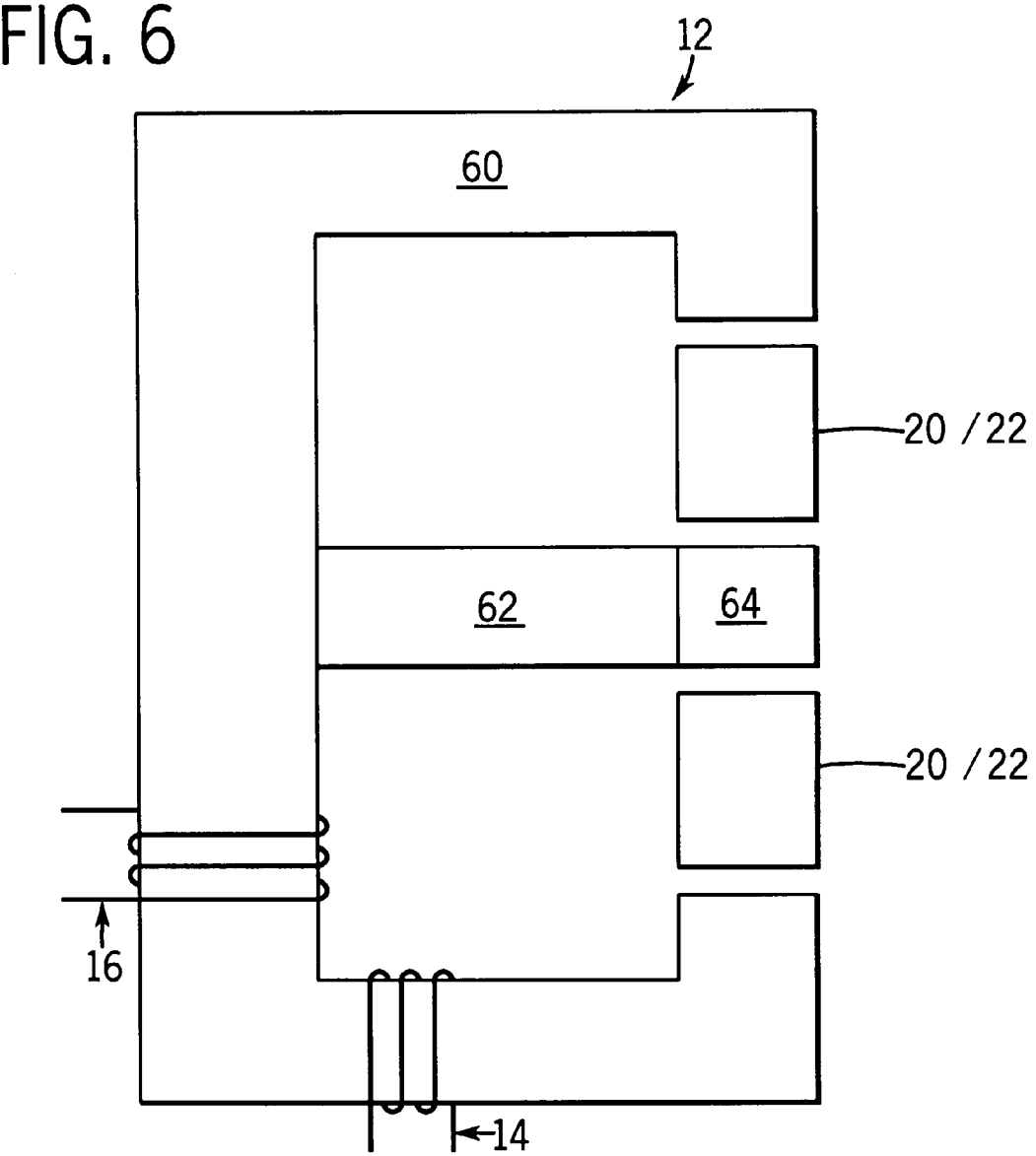
FIG. 6 illustrates a motor generator embodiment with several rotor rings sharing a single stator coil.

One can also axially stack the rotors 20 to obtain larger torque in a single machine. Each rotor ring can have its own set of the stators 12, or several rings can share a single one of the stators 12 as shown in FIG. 6. Here, the stators 12 include a C-shaped ferromagnetic yoke 60 which is attached to a passive ferromagnetic pole 64 by means of a nonmagnetic mechanical member 62.

For efficiency in the motor mode of operation of the motor generator 10, it is desirable to recover the magnetic field energy of the motor coil 14. This can be done by using that energy to help energize the motor coil 14 in a following phase, if the machine is polyphase.

For flywheel energy storage, an axial-flux type of machine has an advantage over a radial-flux type of machine in that when the motor or generator is operating, it tends to stabilize the flywheel in the radial direction. This is important in flywheels with high temperature superconductor bearings, because they tend to suffer several millimeters of radial amplitude when traversing bearing resonances, but have much smaller vertical amplitudes. The radial-flux machines are radially destabilizing.

The axial-gap variable reluctance of the motor generator 10 described here has a number of advantages: the hubless (inside-out) design of the motor generator 10 is more amenable to high-speed operation than reluctance motor designs that have the stator 12 on the outside of the rotor 20, because it allows for a banding ring of substantial thickness. Also if steel is used for the ferromagnet on the rotor 20, it is inherently stronger than a permanent magnet type of machine. Compared to permanent-magnet brushless designs, such as for a Halbach array, the reluctance form of the motor generator 10 should have much lower manufacturing cost. The motor generator 10, while operating, is inherently stable in the radial direction. Varying the stator gap provides the opportunity for a constant voltage output from the generator coils 16 which should improve the efficiency in generator mode over a wide range of operation speeds, while at the same time using less complicated power electronics. The variable gap also allows controlled variation of voltage for some applications.

Because the motor coils 14 can also be deenergized, there should be no idling losses due to the motor generator 10. Because the flux from the motor generator 10 is mostly contained in a closed magnetic circuit, it should also be possible to locate the motor generator 10 in close proximity to the high temperature superconductor bearings 72 (see FIG. 7).

Figure 7:
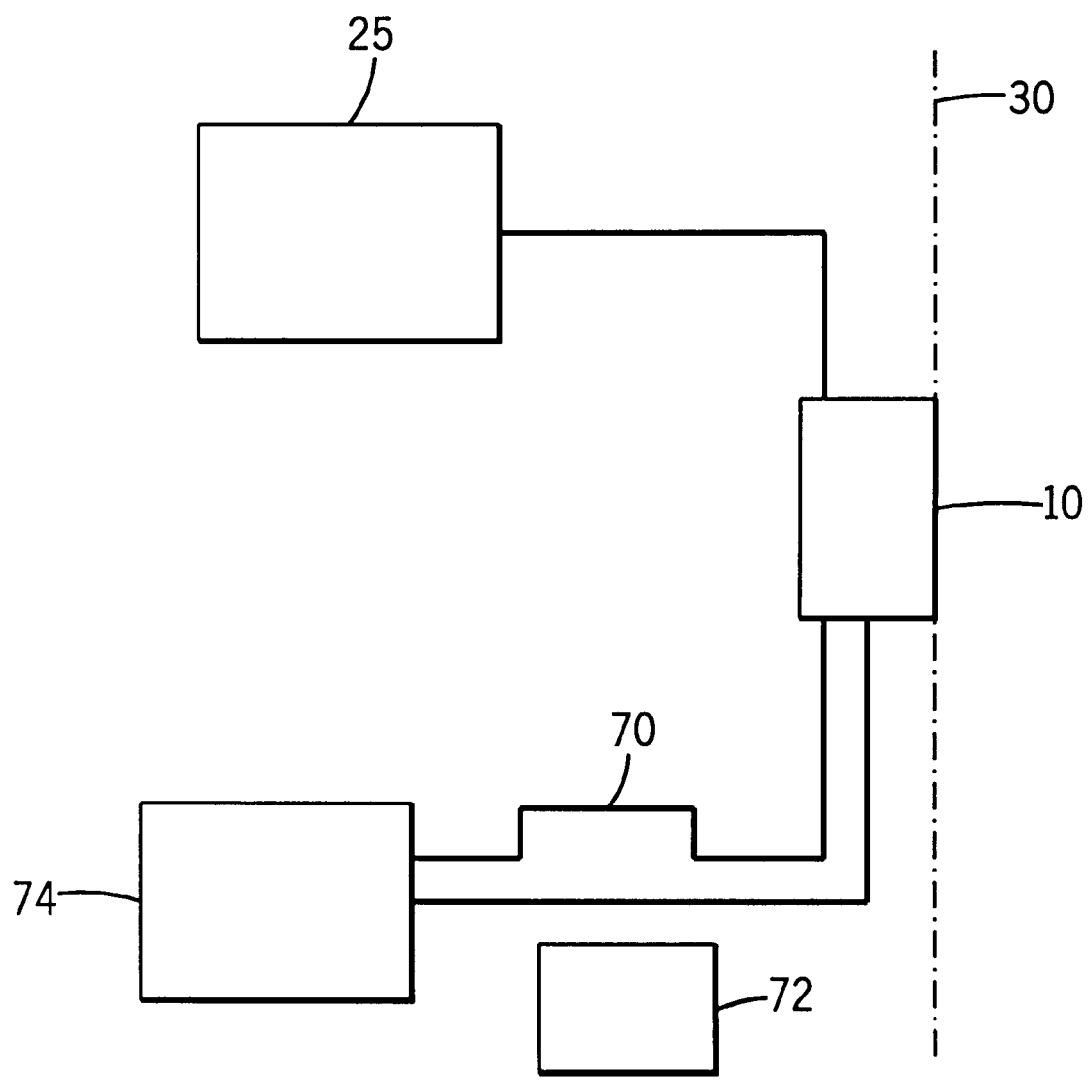
FIG. 7 illustrates an example use of a motor generator in a high temperature superconductor flywheel system.

In FIG. 7 is illustrated an example of use in a flywheel system of the motor generator 10 of the invention. The power supply/control system 25 provides electrical power and control signals to the motor generator 10. The motor generator 10 is coupled to a permanent magnet 70 which interacts with a high temperature superconductor bearing 72 to levitate flywheel 74. As mentioned hereinbefore, these types of superconductor based flywheel systems are well known, as described in incorporated U.S. Pat. No. 5,214, 981, and when combined with the motor generator 10, the result is an advantageous system.

While preferred embodiments have been shown and described, it should be understood that changes and modifications can be made therein without departing from the invention in its broader aspects. Various features of the invention are defined in the following claims.

What is claimed is:

1. A motor generator for supplying a substantially constant output voltage, comprising:

a stator comprised of an upper stator piece and a lower stator piece, a motor coil and a generator coil;

a rotor having an embedded soft ferromagnetic piece disposed between said upper stator piece and said lower stator piece; and an actuator coupled to said lower stator piece and able to move vertically to enable control of a gap between said lower stator piece and said soft ferromagnetic piece, thereby establishing voltage control through adjusting spacing of the gap.

2. The motor generator as defined in claim 1 wherein said upper and lower stator pieces include a return yoke part and a gap G3 is present between said return yoke part of said upper and lower stator pieces, the gap G3=0 in a motor mode of operation for optimizing torque of said motor generator and in a generator mode of operation said motor generator is operated at minimum operating speed.

3. A motor generator for supplying a substantially constant output voltage, comprising:

a stator comprised of an upper stator piece and a lower stator piece, a motor coil and a generator coil;

a rotor having an embedded soft ferromagnetic piece disposed between said upper stator piece and said lower stator piece; and a movable pole piece coupled to the actuator, thereby enabling controlled inductance charges to control output voltage.

* * * * *